(12) United States Patent
Kesavan et al.

(10) Patent No.: US 7,936,708 B2
(45) Date of Patent: May 3, 2011

(54) DEVICE, SYSTEM, AND METHOD OF WIRELESS NETWORK SELECTION AND HANDOVER

(75) Inventors: Vijay Sarathi Kesavan, Hillsboro, OR (US); Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 629 days.

(21) Appl. No.: 12/037,107

(22) Filed: Feb. 26, 2008

(65) Prior Publication Data

US 2009/0215404 A1    Aug. 27, 2009

(51) Int. Cl.
*H04B 7/185* (2006.01)
(52) U.S. Cl. ..... 370/318; 370/311; 370/331; 455/552.1; 455/574
(58) Field of Classification Search .......... 455/502, 455/524, 525, 522, 572, 573, 574, 343.1, 455/343.2, 343.4, 343.5, 550.1, 552.2, 553.1, 455/436–442; 370/331, 332, 311, 318, 338
See application file for complete search history.

(56) References Cited

U.S. PATENT DOCUMENTS

| 7,434,076 | B1 * | 10/2008 | Altounian et al. | 713/324 |
| 7,583,985 | B2 * | 9/2009 | Matson et al. | 455/574 |
| 2005/0068965 | A1 | 3/2005 | Lin et al. | |
| 2005/0075135 | A1 * | 4/2005 | Cromer et al. | 455/558 |
| 2005/0239443 | A1 | 10/2005 | Watanabe et al. | |
| 2007/0072610 | A1 * | 3/2007 | Qiao et al. | 455/436 |
| 2007/0253339 | A1 | 11/2007 | Ovadia et al. | |
| 2008/0049675 | A1 * | 2/2008 | Burgan et al. | 370/331 |

OTHER PUBLICATIONS

The International Search Report and Written Opinion for PCT/US2009/034353 mailed on Sep. 30, 2009.
Pering, T. et al. "CoolSpots: Reducing the Power Consumption of Wireless Mobile Devices with Multiple Radio Interfaces", MobiSys'06, Jun. 19-22, 2006, Uppsala, Sweden, pp. 220-232.
IEEE P802.21™/D7.1, Aug. 2007, Draft Standard for Local and Metropolitan Area Networks: Media Independent Handover Services, pp. 1-339.

* cited by examiner

*Primary Examiner* — Kamran Afshar
(74) *Attorney, Agent, or Firm* — Shiloh et al.

(57) ABSTRACT

Device, system, and method of wireless network selection and handover. A multi-transceiver wireless device includes: at least first and second co-located wireless transceivers; one or more firmware modules to handle network selection of at least one of the first and second wireless transceivers based on one or more commands received from one or more drivers when the multi-transceiver wireless device is in full-power mode; and a manageability engine to handle network selection of at least one of the first and second wireless transceivers when the multi-transceiver wireless device is in reduced-power mode.

24 Claims, 2 Drawing Sheets

FIG. 1

DEVICE, SYSTEM, AND METHOD OF WIRELESS NETWORK SELECTION AND HANDOVER

BACKGROUND

Some wireless devices (e.g., mobile phones, laptop computers, or the like) may include multiple wireless transceivers able to operate in accordance with multiple wireless communication protocols or standards, for example, Institute of Electrical and Electronics Engineers (IEEE) 802.11, IEEE 802.16, Bluetooth, or the like. The multiple wireless transceivers may be implemented using multiple Network Interface Cards (NICs), which may be associated with multiple drivers, multiple connection managers, and multiple Application Programming Interfaces (APIs).

Unfortunately, network selection or network handover operations may require complex interaction among multiple drivers, one or more connection managers, and/or multiple APIs, in order to reach and/or execute a common decision on network selection. Furthermore, handover between a first wireless network and a second wireless network may not be performed while one or more components of the wireless device (e.g., a processor) are in power-save mode.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 1 is a schematic block diagram illustration of a system in accordance with some demonstrative embodiments of the invention.

DETAILED DESCRIPTION

Figure 2:
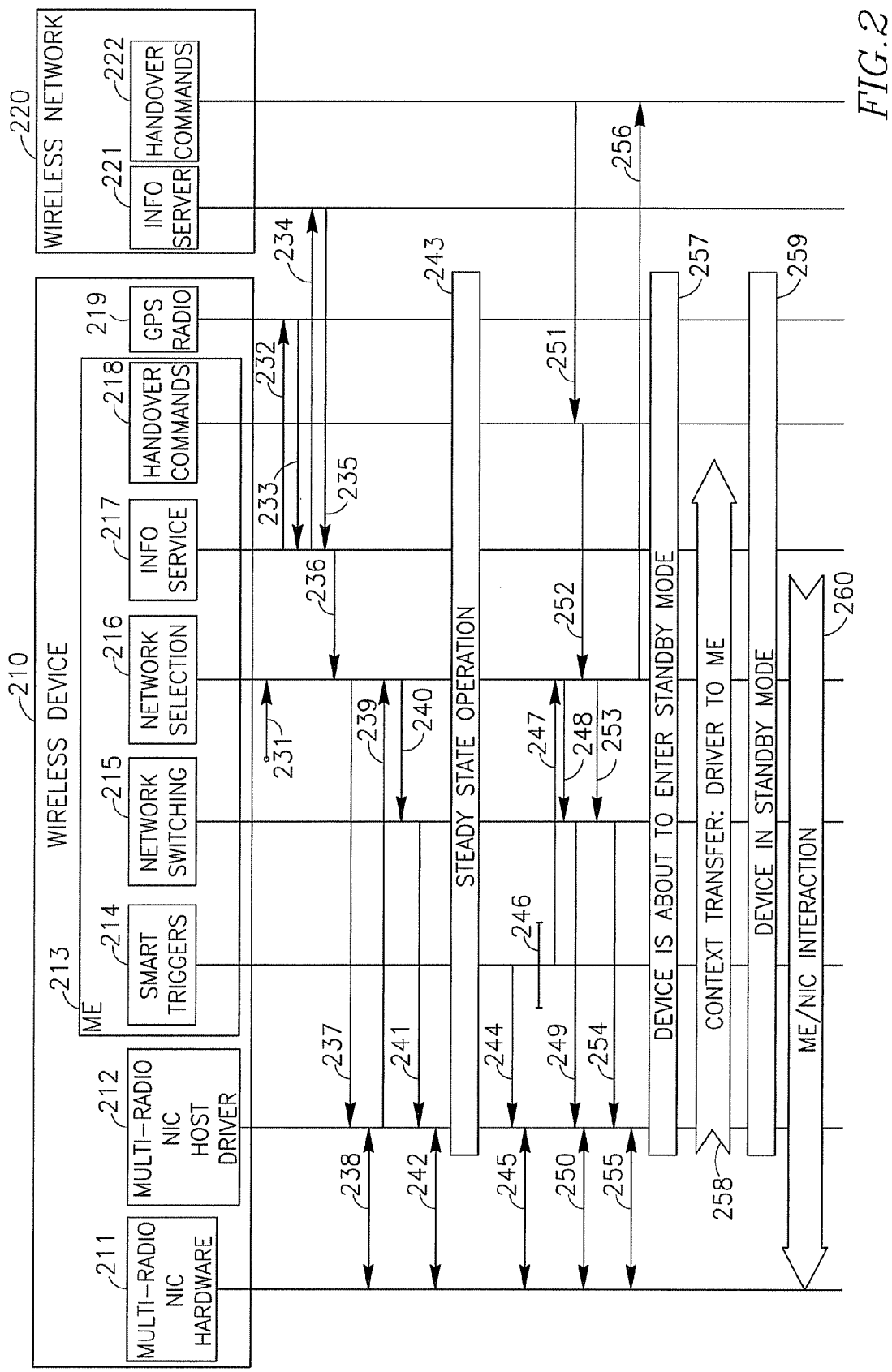
FIG. 2 is a schematic flow-chart of interaction among components of a wireless device in accordance with some demonstrative embodiments of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Some embodiments of the invention may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, "smartphone" devices, a wired or wireless handheld device (e.g., BlackBerry™ devices, Palm™ Treo™ devices or smartphones), a Wireless Application Protocol (WAP) device, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2 G, 2.5 G, 3 G, 3.5 G, Enhanced Data rates for GSM Evolution (EDGE), or the like. Embodiments of the invention may be used in various other devices, systems and/or networks.

The term "wireless device" as used herein includes, for example, a device capable of wireless communication, a communication device capable of wireless communication, a communication station capable of wireless communication, a desktop computer capable of wireless communication, a mobile phone, a cellular phone, a laptop or notebook computer capable of wireless communication, a PDA capable of wireless communication, a handheld device capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service.

The terms "standby mode" or "power-save mode" or "reduced-power mode" as used herein include, for example, a mode or state in which a wireless device operates to conserve or reduce power consumption; a mode or state in which one or more components of the wireless device are deactivated or non-operational; a "sleep mode"; a mode or state in which one or more components of the wireless device do not receive or consume the full amount of power that they are able to receive or consume; a mode or state in which one or more components of the wireless device are non-functional, or have reduced functionality or partial functionality; or the like.

Figure 1:
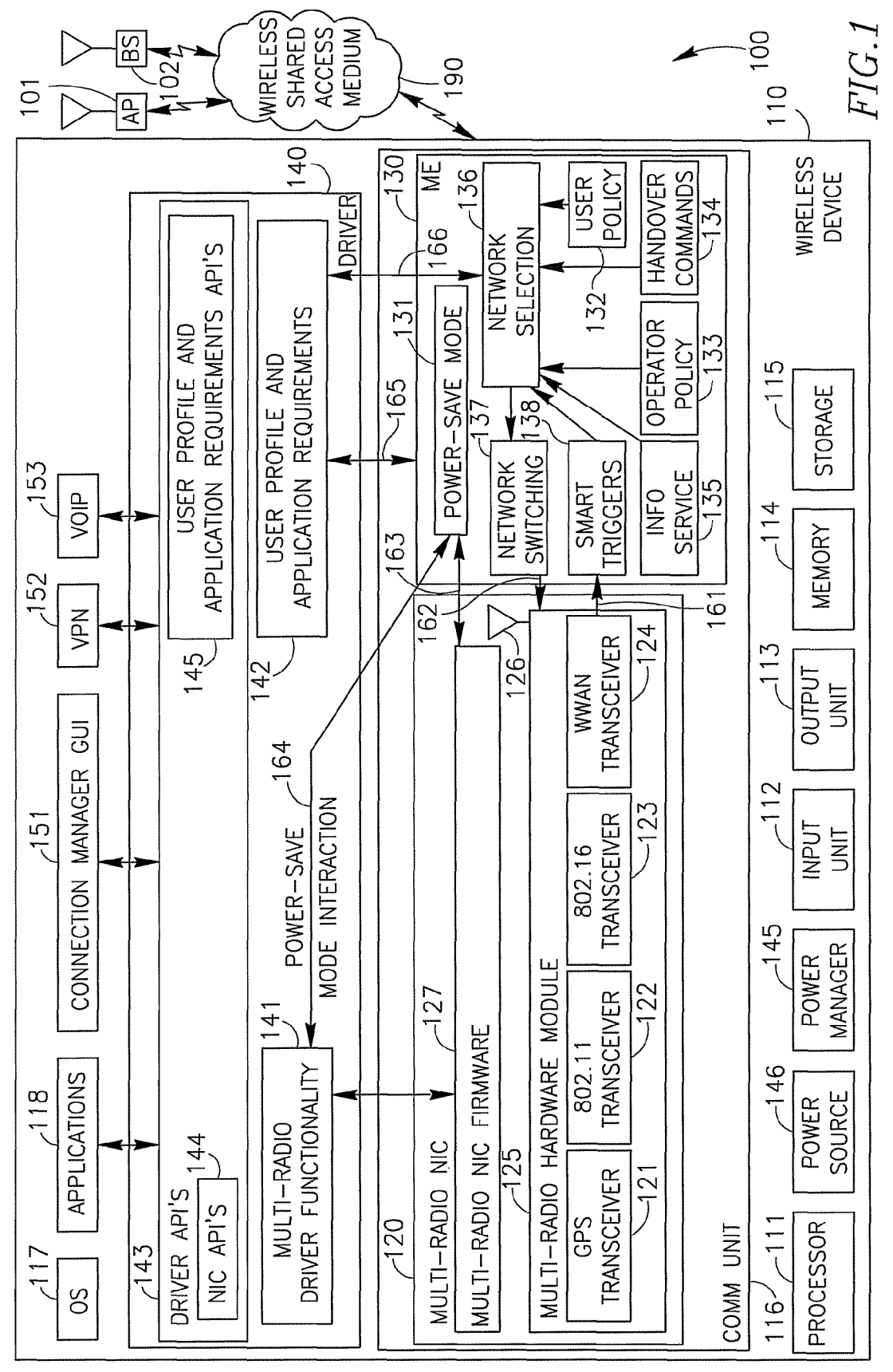

FIG. 1 schematically illustrates a block diagram of a system 100 in accordance with some demonstrative embodiments of the invention. System 100 includes, for example, a wireless communication device 110 able to wirelessly communicate through a wireless shared access medium 190 with one or more other devices, for example, a wireless Access Point (AP) 101 and a wireless Base Station (BS) 102. Components of system 100 may be able to wirelessly communicate with other wireless devices, for example, a wireless controller, a wireless router, a component of an ad-hoc network operating as an AP or a router, an AP of a Basic Service Set (BSS), a device operating as AP in an Independent BSS (IBSS), an AP or a device able to connect among multiple wireless communication devices, a device able to form a wireless communication network, a device able to relay among wireless communication devices, or the like. Although portions of the discussion herein relate, for demonstrative purposes, to a multi-radio NIC utilized in conjunction with wireless communication, some embodiments may be used in conjunction with a wired interface, wired LAN, and/or wired communication.

In some embodiments, system 100 may include one or more wireless communication networks, for example, an a-synchronic wireless network, an asynchronous wireless network, a synchronic wireless network, a synchronous wireless network, a burstable wireless network, a non-burstable wireless network, a hybrid wireless network, a combination of one or more wireless networks, or the like. In some embodiments, for example, system 100 may include an IEEE 802.11 wireless network, an IEEE 802.16 wireless network, a WWAN, Bluetooth communication, GPS communication, and/or other types of wireless links or wireless networks. Although FIG. 1 shows, for demonstrative purposes, a single "cloud" representing wireless shared access medium 190, multiple different wireless networks may be utilized (e.g., simultaneously, in parallel, or the like) by components of system 100, optionally utilizing multiple, different channels, and not necessarily utilizing a single or common air channel; for example, wireless shared access medium 190 may be utilized to allow IEEE 802.11 communication, 802.16 communication, Bluetooth communication, and/or other types of wireless communication, wireless links, and/or wireless networks.

Device 110 includes, for example, a wireless device, a laptop computer, a notebook computer, a desktop computer, a tablet computer, a PDA device, a cellular phone, a mobile phone, a hybrid device (e.g., combining cellular phone functionalities with PDA device functionalities), a relatively small computing device, a non-desktop computer, a portable device, a handheld device, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, or the like.

Device 110 includes, for example, a processor 111, an input unit 112, an output unit 113, a memory unit 114, a storage unit 115, and a communication unit 116. Device 110 may optionally include other suitable hardware components and/or software components. In some embodiments, some or all of the components of device 110 may be enclosed in a common housing or packaging, and may be interconnected or operably associated using one or more wired or wireless links. In other embodiments, components of device 110 may be distributed among multiple or separate devices or locations.

Processor 111 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 executes instructions, for example, of an Operating System (OS) 117 of device 110 or of one or more applications 118.

Input unit 112 includes, for example, a keyboard, a keypad, a mouse, a touch-pad, a track-ball, a stylus, a microphone, or other suitable pointing device or input device. Output unit 113 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 114 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 115 includes, for example, a hard disk drive, a floppy disk drive, a Compact Disk (CD) drive, a CD-ROM drive, a Digital Versatile Disk (DVD) drive, or other suitable removable or non-removable storage units. Memory unit 114 and/or storage unit 115, for example, store data processed by device 110.

Communication unit 116 includes, for example, multiple wireless and/or wired transmitters, receivers and/or transceivers able to send and/or receive wireless and/or wired communication signals, Radio Frequency (RF) signals, frames, blocks, transmission streams, packets, messages, data items, and/or data. For example, communication unit 116 includes a wireless multi-radio Network Interface Card (NIC) 120 and a Manageability Engine (ME) 130. The ME 130 may be implemented, for example, using a co-processor, an embedded co-processor, a virtual machine, a partition, a processor core, or the like.

Communication unit 116 or multi-radio NIC 120 may include, or may be associated with, one or more antennas or one or more sets of antennas 126, for example, an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

Multi-radio NIC 120 includes a multi-radio hardware module 125 associated with a multi-radio firmware 127, for example, a unified or joint firmware module or multiple firmware modules. The multi-radio hardware module 125 includes a combination of multiple co-located wireless transceivers or radios, wireless transmitters and/or wireless receivers, e.g., co-located on a single card or board, sharing a common Integrated Circuit (IC), sharing a common circuit board, sharing a common card or board, sharing a common housing, being in close proximity to each other (e.g., less than ten or fifteen centimeters), and/or optionally sharing one or more of the antennas 126. For example, the multi-radio hardware module 125 includes a GPS transceiver 121, an IEEE 802.11 transceiver 122, an IEEE 802.16 transceiver 123, and a WWAN transceiver 124.

The ME 130 includes a network selection module 136 which receives as input, for example, a user policy 132, an operator policy 133, one or more handover commands 134, input from information service(s) 135, as well as smart triggers 138 (e.g., based on input received through a link 161 from the multi-radio hardware module 125). The ME 130 may further take into account the user profile and application requirements 142, as indicated by arrow 165; for example, the network selection module 136 (or other suitable component of ME 130) may utilize the application requirement 142, as indicated by arrow 165. Based on the wireless network selected by the network selection module 136, a network switching module 137 manages or performs the network switching vis-à-vis the multi-radio hardware module 125, utilizing a link 162.

Device 110 further includes a driver 140 able to control the multiple wireless transceivers of the multi-radio NIC 120. Driver 140 includes multi-radio driver functionality 141 associated with the multi-radio NIC 120. Driver 140 further includes user profile and application requirements 142. Driver 140 additionally includes driver APIs 143, for example, multi-radio NIC APIs 144, as well as user profile and application requirements APIs 145.

Device 110 or one or more components thereof are able to go into, or out of, a power-save mode or other reduced power-mode. The power mode (e.g., power-save mode 131) may be communicated by the driver 140 to the ME 130 (link 164), or by the ME 130 to the multi-radio firmware 127 (link 163). The power-save mode 131 may be implemented, for example, using a power manager 145 able to control, increase and/or decrease the power provided by a power source 146 (e.g., an internal or external battery) to one or more components of device 110, or able to selectively activate or deactivate one or more components of device 110.

In some embodiments, links 161-164 may include, for example, one or more communication links, one or more multimedia links, or other type of links or interface.

One or more applications 118 running on device 110 may initiate or request wireless network switching or wireless network handover. The applications 118 may include, for example, a connection manager User Interface (UI) or Graphic UI (GUI) 151, a Voice over IP (VoIP) application 153, a Virtual Private Network (VPN) application 152, or the like. The applications 118 may communicate with the driver APIs 143 of driver 140, which in turn may operate the multi-radio driver functionality 141 of driver 140 in order to control one or more of wireless transceivers 121-124 of the multi-radio NIC 120. Additionally or alternatively, an operator of a wireless network may request wireless network switching or wireless network handover.

In some embodiments, the architecture of device 110 may be utilized for network selection, seamless network switching, network handover, and/or Media Independent Handover (MIH), for example, in accordance with IEEE 802.21 standard. Furthermore, device 110 may utilize the ME 130 in order to reduce or minimize power consumption, e.g., by eliminating the need to "wale up" a host from a power-save mode to perform inter-network transitions. A single platform thus allows integration of multiple radios on a single chipset; accordingly, network selection, network switching, IEEE 802.21-based MIH, or other operations or services that involve multiple co-located wireless transceivers may be performed efficiently and/or at a reduced power consumption.

In some embodiments, the ME 130 may operate as a wireless connection manager, optionally implementing IEEE 802.21 capabilities. The ME 130 utilizes smart triggers 138, handover commands 134 and information services 135 to perform MIH, e.g., in accordance with IEEE 802.21. The smart triggers 138 indicate changes in state and transmission behavior of the physical and data link layers, or predict the state changes of these layers. The handover commands 134 define a set of primitives or commands which allow clients and network(s) to initiate and coordinate the switching-over process from a first network to a second network. The information services 135 provides a data store of available networks and network parameters, and defines query/response messages (e.g., optionally using standardized messages) to access and retrieve such information (which is utilized in handovers) for each available or accessible network. For example, an information server may reside in an operator network, and includes a repository of networks and their static characteristics.

The architecture of device 110 may eliminate one or more drawbacks of conventional platforms, which require multiple separate NICs to individually and separately access each wireless network. For example, in some conventional platforms, multiple NIC drivers reside on a main host, and it may not be possible to perform IEEE 802.21 inter-network handovers when the host is in power-save mode; for example, it may be required to power-on an entire communication subsystem and host before a handover between networks may be affected.

Some embodiments may not require complex interaction among multiple NIC drivers and multiple connection managers in order to reach a common decision on network selection or on the best network selection. This is in contrast with some conventional systems, in which each wireless NIC is associated with a separate driver and/or connection manager application, and management of adapters and network selection or switching requires multiple levels of APIs and further increases the cost or the complexity of platform.

Some embodiments may not require to implement MIH logic beyond the driver level or the ME level; for example, some embodiments may not require to utilize the upper software stack and/or the OS to implement MIH logic. Some embodiments may eliminate the dependency of a platform on connection managers provided by an Independent Software Vendor (ISV), to which all the Voice over IP (VoIP) applications and audio/video applications may need to develop multiple hooks (e.g., into each ISV component or module).

Some embodiments may eliminate drawbacks or problems which may arise in some conventional platforms having multiple MIH-related components provided by different manufacturers and associated with multiple specific APIs. Some embodiments may thus eliminate duplication of complexity, computing resources or overhead, as well as cost of development to implement MIH logic.

In some embodiments, the client device (e.g., device 110, or other unified communication device or appliance) may not be required to query a server by providing their location (e.g., obtained using GPS) and build a network map of their wireless neighborhood. In some embodiments, smart triggers 138 may be local to system 100 or to a particular wireless network thereof, whereas the handover commands 134 and/or the information service(s) 135 may include interaction with the operator network.

Some embodiments may not require a complex and costly architecture, in which each wireless NIC is implemented separately, using a separate wireless transceiver having separate firmware; which in turn individually communicates with a separate driver; which in turn is individually associated with a separate vendor API; such that the multiple vendor APIs interact, through an adapter control layer, with an application layer logic that includes smart triggers, handover commands, information services, network selection module and network switching module; which in turn utilizes connection manager APIs to interact with multiple applications and/or connection and policy manager(s) (e.g., associated with user policies and operator policies).

Some embodiments utilize a multi-radio platform and connection manager architecture having multiple radios or wireless transceivers integrated on a single NIC. Some embodiments may preserve substantially all network flows, for example, as specified by the IEEE 802.21 protocol. A single or unified point of interaction is provided by the multi-radio NIC 120 for substantially all the upper layer software applications and components. This architecture embeds all MIH components within the ME 130 and a common driver 140 for all network radios. The MIH components within the unified driver 140 and ME 130 (e.g., optionally implemented as a virtual partition or core) may initiate the network selection process and/or network switching.

In some embodiments, impending disconnection of device 110 from an existing wireless network (e.g., IEEE 802.11 network) may be compensated by activating an alternate wireless network (e.g., IEEE 802.16) using the driver 140 and ME 140. For example, loss of the IEEE 802.11 network may be detected by falling signal strength, and may result in a predictive trigger (e.g., indicating "link-going-down"). Additionally or alternatively, the network operator may issue a handover command or handover request to device 110, commanding or requesting the device 110 to switch to another wireless network (e.g., on the same or on a different physical link), for example, for load balancing considerations or due to a change in GPS coordinates which may allow new network availability. The network selection module 136 of the ME 130 tales into account the operator policy 133, and optionally other policies (e.g., user policy 132, Information Technology (IT) policy), user preferences, and application requirements; and may select a new network and initiate a switch to the newly selected network. Accordingly, the ME 130 may implement suitable logic for network connectivity.

Some embodiments allow IEEE 802.21-based network selection and handovers using manageability and virtualized platforms utilizing integrated multi-radios, thereby achieving host power optimization. For example, the integration of multiple wireless radios on a single multi-radio NIC 120 may allow to integrate all of most of the connection manager functionality in the NIC driver 140 and/or the ME 130, thereby allowing to implement driver 140 as "intelligent driver" capable of network selection, network switching and MIH. The multi-radio driver 140 is thus able to control the various wireless radios 121-124, and may include connection management functionality. Furthermore, the ME 130 architecture may allow secure connection to the operator network to retrieve operator policy 133, for interaction using handover commands 134, and/or for obtaining network map(s) from information server(s). The architecture further allows the device 110 to stay connected to a wireless network, by implementing network switching, through the ME 130 (or through a virtual partition), while other components of device 110 are stand-by mode or power-save mode or reduced-power mode, thereby reducing the power consumption of device 110. In some embodiments, device 110 may not include ME 130 implemented as a separate component; for example, network selection, network switching, and other logic or functionalities described herein with reference to the ME 130 may be implemented as part of the multi-radio NIC 120.

Some embodiments may support an "always-on, always-connected" usage model which requires network selection and/or network connectivity even when the host device (e.g., device 110) is in low power or stand-by state. The network selection and network switching is offloaded from the host device to the ME 130, whereas the multi-radio NIC 120 provides the necessary connectivity information to the network selection components, thereby allowing low-power standby operation.

Additionally, the offloading of the handover commands 134 and the information service 135 components of the MIH to the ME 130 allows the interaction with the network operator (e.g., for operator policy 133 download, information service 135, and handover commands 134) to be performed securely and in a manageable way; thereby allowing secure and trusted operator access to network-related policies on the client device 110. For example, since the operator policy 133, network map, and user policy 132 are in the secure ME 130, unauthorized deletion or modifications of these network parameters is eliminated; furthermore, this reduces operator costs in managing profiles on service provider devices, and provides a secure execution environment of operator-critical policies and software.

In some embodiments, the information service 135 runs on the ME 130, and the rest of the platform may be in standby state or reduced-power mode. Accordingly, the network map may still be constantly updated, such that as soon as the platform comes out of the standby state, the network selection module 136 may select a new network for connection.

In some embodiments, applications 118 (e.g., the VPN application 152, Session Initiation Protocol (SIP) based applications, or the like) may need to take into account connectivity changes and may need to interact with the connection manager. In contrast with some conventional platforms, in which the connection manager runs as a user-level application, and in which it may be complex for multiple applications 118 to interface with the connection manager due to proprietary interfaces, some embodiments provide the connection manager as part of the multi-radio NIC driver 140, thereby allowing substantially all the applications 118 to interface through the driver APIs 143 with the driver 140.

FIG. 2 is a schematic flow-chart of interaction among components of a wireless device 210 able to communicate to a wireless network 220. The wireless device 210 includes, for example, a multi-radio NIC hardware 211, a multi-radio NIC host driver 212, a GPS radio 219, and a ME 213. The ME includes, for example, smart triggers 214, network switching module 215, network selection module 216, client-side information service module 217, and client-side handover commands module 218. The wireless network 220 includes, for example, an information server 221, and server-side handover commands module 222.

The network selection module 216 receives as input a local user policy and/or a local operator policy (arrow 231). The information service module 218 requests (arrow 232) and receives (arrow 233) location information from the GPS radio 219. The client-side information service module 217 sends a query (arrow 234) to the information server 221, which returns a list of wireless network(s) (arrow 235). The client-side information service module 217 transfers to the network selection module 216 a network(s) map (arrow 236) based on the location of the wireless device 210. The network selection module 216 commands the multi-radio NIC host driver 212 to scan wireless network(s) using one or more wireless transceivers of the wireless device 210 (arrow 237). The multi-radio NIC host driver 212 and the multi-radio NIC hardware 211 exchange a request and a response (arrow 238) for wireless network scan; and the result of the wireless network(s) scan is returned by the multi-radio NIC host driver 212 to the network selection module 216 (arrow 239).

The network selection module 216 selects a new wireless network based on policies including user policy, operator policy, application requirements and other criteria; and the network selection module 216 commands the network switching module 215 to switch to the new wireless network (arrow 240). The network switching module 215 commands the multi-radio NIC host driver 212 to disconnect from the current wireless network and to connect to the new wireless network or vice versa (namely, first connect to new wireless network and then disconnect from the current network) (arrow 241). The multi-radio NIC host driver 212 and the multi-radio NIC hardware 211 exchange a request and a response (arrow 242) for wireless network disconnection and connection.

The wireless device 210 may enter steady state operation 243. Then, the smart triggers 214 may command the multi-radio NIC host driver 212 to query the Media Access Control (MAC)/Physical (PHY) link layer properties for one or more wireless transceivers of wireless device 210 (arrow 244). The multi-radio NIC host driver 212 and the multi-radio NIC hardware 211 exchange a request and a response (arrow 245) for wireless MAC/PHY properties, and the smart triggers 214 determine the quality of wireless connection (line 246). For example, the smart triggers 214 may notify the network selection module 216 that the quality of the current wireless communication link is deteriorating (arrow 247), or is below or crosses a pre-defined link quality threshold. The network selection module 216 selects a new wireless network and commands the network switching module 215 to switch to the new wireless network (arrow 248). The network switching module 215 commands the multi-radio NIC host driver 212 to disconnect from the current wireless network and to connect to the new wireless network (arrow 249) or vice versa (namely, first connect to the new wireless network and then disconnect from the current network). The multi-radio NIC host driver 212 and the multi-radio NIC hardware 211 exchange a request and a response (arrow 250) for wireless network disconnection and connection.

The server-side handover commands module 222 may send to the client-side handover commands module 218 a handover command indicating a network-initiated or operator-initiated handover command (arrow 251). The client-side handover commands module 218 transfers the handover command to the network selection module 216 (arrow 252). Depending on the handover command, the network selection module 216 may select a new network and commands the network switching module 215 to switch to the new network (arrow 253). The network switching module 215 commands the multi-radio NIC host driver 212 to disconnect from the current wireless network and to connect to the new wireless network (arrow 254). The multi-radio NIC host driver 212 and the multi-radio NIC hardware 211 exchange a request and a response (arrow 255) for wireless network disconnection and connection. The network selection module 216 reports the handover completion status to the server-side handover commands module 222 (arrow 256).

The wireless device 210 may be required to enter a reduced-power mode, a power-save mode, or a standby mode 257. Accordingly, context is transferred from the multi-radio NIC host driver 212 to the ME 213, and the wireless device 210 enters standby mode (arrow 258). The transferred context may include, for example, connection context, application context, TCP/IP context, a combination of multiple context parameters, or substantially entire mobility context. Once the wireless device is in standby mode (block 259), the ME 213 may interact with the multi-radio NIC hardware 211 (arrow 260). Once the wireless device exits the standby mode, context (e.g., an updated context) may be transferred from the ME 213 to the multi-radio NIC host driver 212.

Although FIG. 2 shows, for demonstrative purposes, a sequence of operations or events in accordance with some embodiments, other embodiments may utilize other sets of operations and other sequences of events. For example, FIG. 2 demonstrates an information service module service module requesting for network map and resulting in network switching; followed by smart trigger generation resulting in network switching; further followed by network handover command resulting in network switching. In other embodiments, these events (namely, querying for network map, smart triggers, and handover commands) may be asynchronous and may occur other sequences. Similarly, particular operations shown in FIG. 2 may be performed asynchronously or in other sequences; for example, the operation of arrow 251 need not necessarily be performed after the operation of arrow 250; or the like.

Other operations or sets of operations may be used in accordance with some embodiments of the invention. For example, in some embodiments, in order to determine whether or not to change a wireless communication link, or to switch wireless networks, power-related properties may be estimated, calculated or utilized, e.g., instead of or in addition to utilizing link quality properties or other suitable parameters. For example, some embodiments may determine to change a wireless communication link or to switch between wireless communication networks if it is determined or estimated that a first wireless communication link may offer lower power consumption relative to a second wireless communication link, or if it is determined or estimated that changing the wireless link may result in reduced power consumption.

In some embodiments, in order to switch between wireless networks or between wireless links, the wireless device disconnects a first wireless link with a first wireless network, and then establishes a second wireless link with a second wireless network. In other embodiments, in order to switch between wireless networks, the wireless device maintains the first wireless link with the first wireless network, then establishes the second wireless link with the second wireless network, and then disconnects the first wireless link with the first wireless network (e.g., "make-before-break"). In some embodiments, the wireless device maintains both the first and second wireless links active, and an application service is switched from the first wireless network to the second wireless network. In some embodiments, network switching may utilize two transceivers, for example, disconnection of a first transceiver from a first network and connection of a second transceiver to a second network (in this order, or in reverse order). In other embodiments, network switching or link switching may utilize a single transceiver, for example, to disconnect from a first network and to connect to a second network. Other network switching mechanisms may be used.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and/or an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A multi-transceiver wireless device comprising:
at least first and second co-located wireless transceivers;
one or more firmware modules to handle network selection of at least one of the first and second wireless transceivers based on one or more commands received from one or more drivers when the multi-transceiver wireless device is in full-power mode; and
a manageability engine to handle network selection of at least one of the first and second wireless transceivers when the multi-transceiver wireless device is in reduced-power mode, wherein the manageability engine is to receive a context from the one or more drivers substantially immediately prior to entering the reduced-power mode, the context comprising one or more of connection context, application context, TCP/IP context, a plurality of context parameters, and substantially an entire mobility context.

2. The multi-transceiver wireless device of claim 1, wherein the manageability engine comprises:
a client-side information service module to query an information server for a list of one or more available wireless networks.

3. The multi-transceiver wireless device of claim 2, wherein the manageability engine comprises:
a network selection module to select a wireless network from the list of one or more available wireless networks received from the information server.

4. The multi-transceiver wireless device of claim 3, wherein the manageability engine comprises:
a smart triggers module to query Media Access Control (MAC)/Physical (PHY) link layer properties for at least one of the first and second wireless transceivers, to determine a quality of a wireless communication link, and to generate one or more smart triggers if the link quality crosses a threshold value,
wherein the network selection module is to determine whether or not to switch the multi-transceiver wireless device from a first wireless network to a second wireless network based on the one or more smart triggers.

5. The multi-transceiver wireless device of claim 3, wherein the manageability engine comprises:
a smart triggers module to estimate a power consumption parameter associated with at least one of the first and second wireless transceivers, and to generate one or more smart triggers if reduced power consumption is estimated to result from switching from a first wireless network to a second wireless network,
wherein the network selection module is to determine whether or not to switch the multi-transceiver wireless device from the first wireless network to the second wireless network based on the one or more smart triggers.

6. The multi-transceiver wireless device of claim 3, wherein the network selection module is to determine whether or not to switch the multi-transceiver wireless device from a first wireless network to a second wireless network based on one or more handover commands received from a wireless network operator.

7. The multi-transceiver wireless device of claim 3, wherein the network selection module is to determine whether or not to switch the multi-transceiver wireless device from a first wireless network to a second wireless network based on a user policy stored in the manageability engine.

8. The multi-transceiver wireless device of claim 3, wherein the network selection module is to determine whether or not to switch the multi-transceiver wireless device from a first wireless network to a second wireless network based on a wireless network operator policy stored in the manageability engine.

9. The multi-transceiver wireless device of claim 3, wherein the network selection module is to determine whether or not to switch the multi-transceiver wireless device from a first wireless network to a second wireless network based on a wireless network operator policy delivered by the wireless network operator to the manageability engine.

10. The multi-transceiver wireless device of claim 3, wherein the manageability engine comprises:
a network switching module to disconnect the first wireless transceiver from a first wireless network and then to connect the second wireless transceiver to a second wireless network.

11. The multi-transceiver wireless device of claim 3, wherein the manageability engine comprises:
a network switching module to connect the second wireless transceiver to a second wireless network and then to disconnect the first wireless transceiver from a first wireless network.

12. The multi-transceiver wireless device of claim 1, wherein the one or more firmware modules comprise:
a unified firmware module able to control the first and second wireless transceivers.

13. The multi-transceiver wireless device of claim 1, wherein the manageability engine comprises a smart triggers module to generate one or more smart triggers based on one or more properties associated with at least one of the first and second wireless transceivers, and a network selection module to determine whether or not to switch the multi-transceiver wireless device from a first wireless network to a second wireless network based on the one or more smart triggers.

14. The multi-transceiver wireless device of claim 1, wherein the manageability engine is to transfer updated context to the one or more drivers substantially immediately subsequent to exiting reduced-power mode,
wherein the updated context comprises one or more of: updated connection context, updated application context, updated TCP/IP context, a plurality of updated context parameters, and substantially an updated entire mobility context.

15. The multi-transceiver wireless device of claim 1 comprising said one or more drivers, wherein the one or more drivers comprise a unified multi-transceiver driver able to manage wireless communication links of the first and second wireless transceivers.

16. The multi-transceiver wireless device of claim 15, comprising: a unified Application Programming Interface (API) to interface between the unified multi-transceiver driver and one or more applications.

17. The multi-transceiver wireless device of claim 1, wherein the multi-transceiver wireless device comprises a device selected from the group consisting of: a laptop computer, a notebook computer, a tablet computer, a cellular phone, a handheld device, a wireless communication device, a wireless communication station, and a Personal Digital Assistant device.

18. A system comprising:
a manageability engine to manage network selection and network switching for a multi-radio hardware module during a reduced-power mode of a host of said multi-radio hardware module, wherein the manageability engine comprises:
a client-side information service module to query an information server for a list of one or more available wireless networks;
a network selection module to select a wireless network from the list of one or more available wireless networks received from the information server; and
a network switching module to disconnect a first radio of the multi-radio hardware module from a first wireless network and to connect a second radio of the multi-radio hardware module to a second wireless network.

19. The system of claim 18, wherein the network selection module is to determine whether or not to switch from the first wireless network to the second wireless network based on one or more of:
a handover command received from a wireless network operator;
a user policy stored in the manageability engine;
a wireless network operator policy stored in the manageability engine;
a wireless network operator policy delivered by the wireless network operator to the manageability engine; and
one or more smart triggers generated by the manageability engine.

20. The system of claim 19, wherein the manageability engine comprises:
a smart triggers module to query Media Access Control (MAC)/Physical (PHY) link layer properties for at least one of the first and second wireless transceivers, to determine a quality of a wireless communication link, and to generate the one or more smart triggers if the link quality crosses a threshold value.

21. The system of claim 18, wherein the manageability engine comprises a smart triggers module to estimate a power consumption parameter associated with at least one of the first and second wireless transceivers, and to generate the one or more smart triggers if reduced power consumption is estimated to result from switching from the first wireless network to the second wireless network.

22. A method comprising:
during a full-power mode of a host of a multi-transceiver hardware module, operating a first component to handle network selection of at least one of first and second wireless transceivers of the multi-transceiver hardware module;
during a reduced-power mode of the host of the multi-transceiver hardware module, operating a second component to handle network selection of at least one of the first and second wireless transceivers of the multi-transceiver hardware module; and
substantially immediately subsequent to exiting the reduced-power mode, transferring updated context from the second component to the first component, wherein the updated context comprises one or more of updated connection context, updated application context, updated TCP/IP context, a plurality of updated context parameters, and substantially an updated entire mobility context.

23. The method of claim 22, comprising:
substantially immediately prior to entering the reduced-power mode, transferring context from the first component to the second component, wherein the context comprises one or more of connection context, application context, TCP/IP context, a plurality of context parameters, and substantially an entire mobility context.

24. The method of claim 22, comprising: generating one or more smart triggers based on one or more properties for at least one of the first and second wireless transceivers; and determining whether or not to switch the host from a first wireless network to a second wireless network based on the one or more smart triggers.

* * * * *